3,149,096
PROCESS OF WORKING UP LOW-PRESSURE
POLYOLEFINE DISPERSIONS
Albert Frese, Marl, Kreis Recklinghausen, Germany, assignor to Chemische Werke Hüls Aktiengesellschaft, Marl, Kreis Recklinghausen, Germany, a corporation of Germany
No Drawing. Filed Nov. 17, 1960, Ser. No. 69,820
Claims priority, application Germany, Jan. 21, 1960, C 20,611
1 Claim. (Cl. 260—93.7)

It is known that it is difficult to work up the low pressure polyolefine dispersions which are produced by the polymerization of alpha olefines such as propylene and alpha butylene by means of mixed catalysts of titanium trichloride and metalloorganic compounds of aluminum. Although the known means for the decomposition and separation of the mixed catalyst residues, such as alcoholic hydrochloric acid and alcohol, generally permit the production, without difficulty, of products having an ash content of less than 0.02% from low pressure polyethylene dispersions, this is not possible in the case of dispersions of the poly alpha olefines. In the working up of the last named dispersions much larger amounts of the decomposing agents and greater expenses are involved in order to produce products having ash contents as low as 0.04%.

It has been found that dispersions of low pressure polyolefines made by the polymerization of alpha olefines with mixed catalysts of titanium trichloride and metalloorganic compounds of aluminum in inert diluents can be worked up more advantageously if, prior to the actual decomposition and separation of the mixed catalyst residues, the crude low pressure polyolefine dispersions are treated with normally gaseous hydrogen halides.

In the present invention the low-pressure polyolefine dispersions are produced in known manner by polymerization of alpha olefines in a 0.1 to 25%, preferably a 0.5 to 5% suspension of mixed catalyst, consisting of titanium trichloride and 0.01 to 10, preferably 0.05 to 1 mole or organo-metallic compound of aluminum for every mole of titanium trichloride in inert diluents at pressures of 0.5 to 100 preferably 1 to 10 atmospheres and at temperatures of −20 to 200° C. preferably +20 to 150° C. Aliphatic, cycloaliphatic and aromatic hydrocarbons and hydrocarbon mixtures, for example butane, hexane, benzine fractions, diesel oil fractions, benzene, xylene, cyclohexane etc., may be used as the inert diluents. Hydrogen chloride or hydrogen bromide or hydrogen iodide may be used as the hydrogen halide. The hydrogen halides are used in amounts within the range from 0.1 to 3, preferably from 0.3 to 1 mole based upon amount of metalloorganic compound of aluminum used in the mixed catalysts. The hydrogen halides are applied to the dispersions at temperatures within the range from 0 to 100° C. and preferably at the polymerization temperature. The reaction of the hydrogen halides with the metalloorganic compound of aluminum take place instantly.

After the treatment with hydrogen halide the mixed catalyst residue can be easily and completely converted into soluble form and then separated in the known manner. For instance the mixed catalyst residue is decomposed by treatment of the low pressure dispersion after introduction of the hydrogen halide with from 3 to 25%, preferably from 5 to 10%, calculated upon the inert diluent of an alcohol which is soluble in both the inert diluent and water. The normal, unbranched, water-free alcohols having from 1 to 4 carbon atoms such as methanol, ethanol, n-propanol and n-butanol are especially suitable for use in the process. After the decomposition of the mixed catalyst residue the low pressure polyolefine is worked up in the known manner, for example it is separated from the inert diluent by filtering, decanting or centrifuging and then washed with alcohol and with aqueous alcohol or with water. In the washing operation the low pressure polyolefine is slurried with the washing liquid and then separated again in known manner as by filtration, decantation or centrifuging. The washing may be repeated. Generally an emulsifier such as an ethoxylated alkyl phenol, an ethoxylated fatty acid or an alkylaryl sulfonate is added to the first wash water in an amount within the range from 0.01 to 1% calculated upon the weight of the low-pressure polyolefine in order to improve the wetting action. In this case care must be taken that the emulsifier is completely separated in the subsequent washing. Finally the separated and washed polymer is dried.

The preliminary treatment of the low pressure polyolefine dispersions with gaseous hydrogen halides makes it possible to produce products having ash contents of less than 0.01% from the low pressure polymerizates of alpha olefines more simply and by the use of smaller amounts of the catalyst decomposing agents such as alcohols.

The invention is illustrated by the following specific examples.

*Example 1*

1.4 parts by weight of gaseous hydrogen chloride were introduced, at 50° C., into a low pressure polypropylene dispersion which had been produced by the introduction of 200 parts by weight of propylene at 50° C., and at 2 atmospheres pressure into 700 parts by weight of heptane containing the products of the reaction therein at 50° C. of 3 parts by weight of alpha titanium trichloride (violet modification) with 4.5 parts by weight of aluminum triethyl. Then 40 parts by weight of methanol were added. The resulting mixture was filtered to separate the polypropylene from the heptane-methanol mixture and the separated polypropylene was washed on the filter with 50 parts by weight of methanol. The polypropylene was then slurried at 60° C. for three hours in a mixture of 300 parts by weight of methanol and 400 parts by weight of water and again separated on a filter and washed on the filter with a mixture of 25 parts by weight of methanol and 75 parts by weight of water and then dried. The resulting low pressure polypropylene had an ash content of 0.01%.

*Example 2*

The low-pressure polypropylene dispersion of Example 1 was treated at 50° C. with 1.4 parts by weight of hydrogen chloride, cooled to 20° C. and then treated with 35 parts by weight of methanol. After five hours the polypropylene was separated from solvent on a filter and then washed on the filter with 100 parts by weight of methanol and finally slurried for 3 hours at 30° C. in 700 parts by weight of water containing 0.2 part by weight of ethoxylated dodecylphenol. The water was separated by filtration and the polypropylene was then washed with 150 parts by weight of water and dried. The low pressure polypropylene product had an ash content of 0.02%.

*Example 3*

The low pressure polypropylene dispersion of Example 1 was treated with 0.2 part by weight of hydrogen chloride. After cooling to room temperature 30 parts by weight of n-butanol were added and the polymerizate was then separated from the heptane-butanol mixture on a suitable filter. The polypropylene was washed on the filter with 100 parts by weight of n-butanol and then slurried for 4 hours at 80° C. with 700 parts by weight of n-butanol. After cooling to 25° C. the polypropylene was separated on a filter from the n-butanol and washed on the filter with 100 parts by weight of n-butanol and then dried. The product contained less than 0.01% of ash.

*Example 4*

A low-pressure polybutylene dispersion produced by reacting a solution of 4.5 parts by weight of diethylaluminum monochloride in 700 parts by weight of hexane with 3 parts by weight of titanium aluminum chloride ($3TiCl_3 \cdot AlCl_3$) at 50° C. and then introducing 200 parts by weight of alpha butylene at 50° C. under 1.5 atmospheres pressure was treated with 1.4 parts by weight of hydrogen chloride and then decomposed with 40 parts by weight of methanol. The decomposed polybutylene dispersion was intensively mixed with 150 parts by weight of water at 20° C. After 30 minutes the stirring was stopped and the water-alcohol phase separated. The polymerizate was then washed three times in the same manner with 150 parts by weight of water containing 0.2 part by weight of ethoxylated fatty alcohol. The resulting purified low-pressure polybutylene was separated on a filter from a hexane-water mixture and then dried. It contained 0.02% of ash.

I claim:

In a process for the production of low pressure poly alpha olefines comprising polymerizing an alpha olefine selected from the group consisting of propylene and alpha butylene in an inert diluent in the presence of a mixed catalyst formed by the reaction of titanium trichloride with a metalloorganic compound of aluminum selected from the group consisting of aluminum triethyl and diethylaluminum monochloride and decomposing the catalyst residue in the resulting polyolefine dispersion by the addition thereto of a normal unbranched water-free alcohol having from 1 to 4 carbon atoms, the improvement which consists in that from 0.1 to 3 moles of a hydrogen halide selected from the group consisting of HCl, HBr and HI per 1 mole of said metalloorganic compound of aluminum used in forming the catalyst is added to the dispersion after polymerization and before the addition of said alcohol.

References Cited in the file of this patent

UNITED STATES PATENTS

| | | |
|---|---|---|
| 2,874,153 | Bowman et al. | Feb. 17, 1959 |
| 2,912,425 | Bailey | Nov. 10, 1959 |
| 2,938,021 | Geiser et al. | May 24, 1960 |
| 2,962,488 | Horne | Nov. 29, 1960 |
| 2,971,950 | Natta et al. | Feb. 14, 1961 |

FOREIGN PATENTS

| | | |
|---|---|---|
| 538,782 | Belgium | Apr. 2, 1956 |